United States Patent
Ochi

(10) Patent No.: US 10,399,330 B2
(45) Date of Patent: Sep. 3, 2019

(54) METHOD FOR FORMING A THREE-DIMENSIONAL OBJECT

(71) Applicant: MIMAKI ENGINEERING CO., LTD., Nagano (JP)

(72) Inventor: Kazuhiro Ochi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 47 days.

(21) Appl. No.: 15/675,325

(22) Filed: Aug. 11, 2017

(65) Prior Publication Data
US 2018/0043680 A1    Feb. 15, 2018

(30) Foreign Application Priority Data
Aug. 12, 2016    (JP) .................. 2016-159025

(51) Int. Cl.
*B29C 33/44*    (2006.01)
*B29C 33/52*    (2006.01)
*B41J 2/04*    (2006.01)
*B29C 64/112*    (2017.01)
*B29C 64/153*    (2017.01)
*B29C 64/40*    (2017.01)
*B29C 64/194*    (2017.01)

(52) U.S. Cl.
CPC .............. *B41J 2/04* (2013.01); *B29C 33/448* (2013.01); *B29C 64/112* (2017.08); *B29C 64/153* (2017.08); *B29C 64/40* (2017.08); *B29C 64/194* (2017.08)

(58) Field of Classification Search
CPC ....... B29C 33/44; B29C 33/448; B29C 33/52; B29C 64/112; B29C 64/40
USPC .................................... 264/308, 317
See application file for complete search history.

(56) References Cited

U.S. PATENT DOCUMENTS

| | | | |
|---|---|---|---|
| 2005/0053798 A1* | 3/2005 | Maekawa | B29C 64/40 428/542.8 |
| 2011/0104643 A1* | 5/2011 | Giordano | B29C 64/112 433/203.1 |
| 2018/0009230 A1* | 1/2018 | Ohnishi | B41J 2/17596 |

* cited by examiner

*Primary Examiner* — Leo B Tentoni
(74) *Attorney, Agent, or Firm* — Rankin, Hill & Clark LLP

(57) ABSTRACT

A method for forming a three-dimensional object by extruding ink droplets from ink-jet heads includes forming an inner build region of the object. A colored region is formed outside of the inner build region so as to color the object. A support region is formed outside of the colored region so as to support the object while the object is being formed. An intermediate region is formed between the inner build region and the colored region. The intermediate region is formed in such a manner that affinity between the intermediate region and the inner build region and affinity between the intermediate region and the colored region are higher than affinity between the colored region and the support region.

1 Claim, 8 Drawing Sheets

METHOD FOR FORMING A THREE-DIMENSIONAL OBJECT

CROSS-REFERENCE TO RELATED APPLICATIONS

The present application claims priority under 35 U.S.C. § 119 to Japanese Patent Application No. 2016-159025, filed Aug. 12, 2016. The contents of this application are incorporated herein by reference in their entirety.

BACKGROUND

Field of the Invention

The present invention relates to a method for forming a three-dimensional object, a three-dimensional-object forming apparatus, and a non-transitory computer readable medium storing a program for the three-dimensional-object forming apparatus.

Discussion of the Background

As a method for forming a three-dimensional object, in addition to sheet lamination as disclosed in Japanese Unexamined Patent Application Publication No. 2003-71530, fused deposition molding (FDM), ink-jet technology, ink-jet binder technology, stereo lithography (SL), and selective laser sintering (SLS), for example, have been known.

Among these methods, as an ink-jet technology, a method of injecting ultraviolet curable resins and depositing layers of patterns by a 3D printer has been adopted with high frequency. In this method, after designs, mechanisms, and other information of external and internal appearances of an end product are converted into data by a three-dimensional CAD, the data is sliced into multi-layered pattern data in a manner like deposition of thin sheets by a computer. Then, the ultraviolet curable resins are injected from heads based on the pattern data to form build material layers, and the build material layers are deposited to produce a three-dimensional object.

Moreover, decoration (patterns and other design features, and colors) of the three-dimensional object formed by such a method has been known.

The contents of Japanese Unexamined Patent Application Publication No. 2003-71530 are incorporated herein by reference in their entirety.

In a case in which formation of a three-dimensional object in an ink-jet technology is performed by additive manufacturing of depositing a plurality of ink layers, the plurality of ink layers, which correspond to a plurality of sections into which the three-dimensional object is divided in a build direction, are to be formed in sequence. In this case, each of the ink layers includes a center region corresponding to an external shape of the three-dimensional object, a colored region surrounding an outer circumference of the center region, and a support region (support region) surrounding the colored region. The center region, the colored region, and the support region are respectively formed by extruding an ink for the center region, an ink for decoration (such as coloring inks of yellow, magenta, cyan, black, and other colors), and an ink for the support region from heads corresponding to the respective inks.

In this method, the support region is provided to support other ink layers deposited on an upper side of the three-dimensional object, and the support region is to be removed after forming the three-dimensional object.

After formation of the three-dimensional object in the ink-jet technology is performed by additive manufacturing, and when the support region is removed, however, a color quality of the obtained three-dimensional object (object) may be unfortunately degraded. In light of the above circumstances, there has been a demand for improving the color quality of the three-dimensional object finally obtained.

SUMMARY

According to one aspect of the present invention, a method for forming a three-dimensional object by extruding ink droplets from ink-jet heads includes: forming an inner build region of the object; forming a colored region outside of the inner build region so as to color the object; forming a support region outside of the colored region so as to support the object while forming the object; and forming an intermediate region between the inner build region and the colored region. The intermediate region is formed in such a manner that affinity between the intermediate region and the inner build region and affinity between the intermediate region and the colored region are higher than affinity between the colored region and the support region.

The inventor of the present disclosure has found that when surface roughness of the colored region after removing the support region increases, a color quality of the formed three-dimensional object is unfortunately degraded. The inventor conducted research and study on what causes an increase in the surface roughness of the colored region. As a result, the inventor has realized that in forming each ink layer, as a degree of mixing of an ink composite of the colored region and an ink composite of the support region at an interface between the colored region and the support region increases, the surface roughness of the colored region after removing the support region increases. In light of the above circumstances, the inventor has concluded to interpose the intermediate region between the inner build region and the colored region so as to make affinity between the colored region and the inner build region higher than affinity between the colored region and the support region. This suppresses mixing of the inks at the interface between the colored region and the support region so as to improve the surface roughness of the colored region after removing the support region. Thus, the three-dimensional object finally obtained has an improved color quality.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENT

Figure 1:
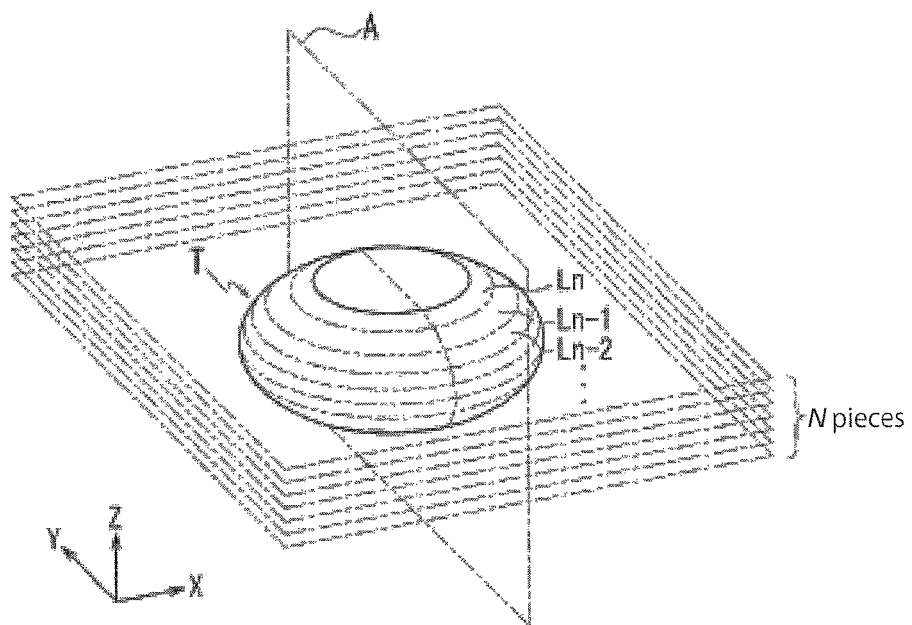
FIG. 1 is a perspective view of an exemplary three-dimensional object formed by a forming apparatus according to an embodiment.

An embodiment of the present invention will now be described with reference to the accompanying drawings, wherein like reference numerals designate corresponding or identical elements throughout the various drawings.

Figure 2:
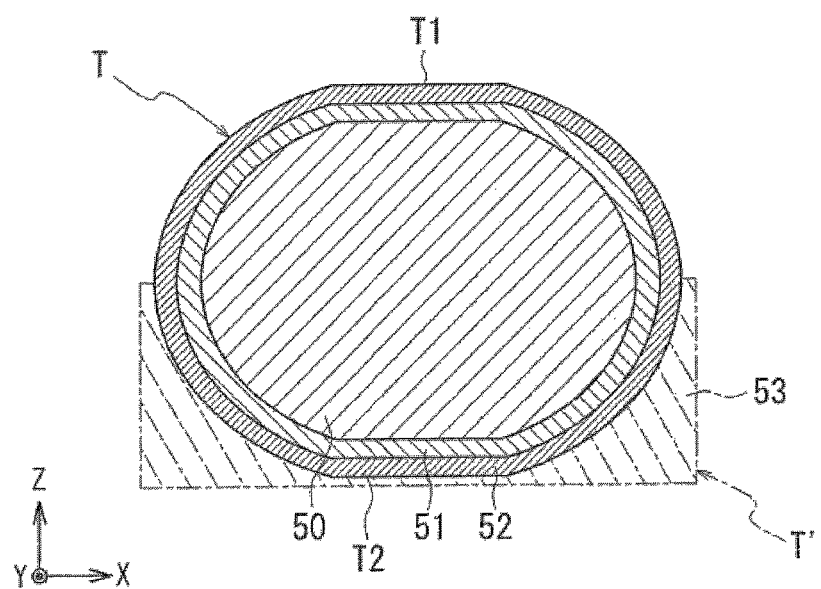
FIG. 2 is a cross-sectional view of the three-dimensional object formed by the forming apparatus.
Figure 3A:
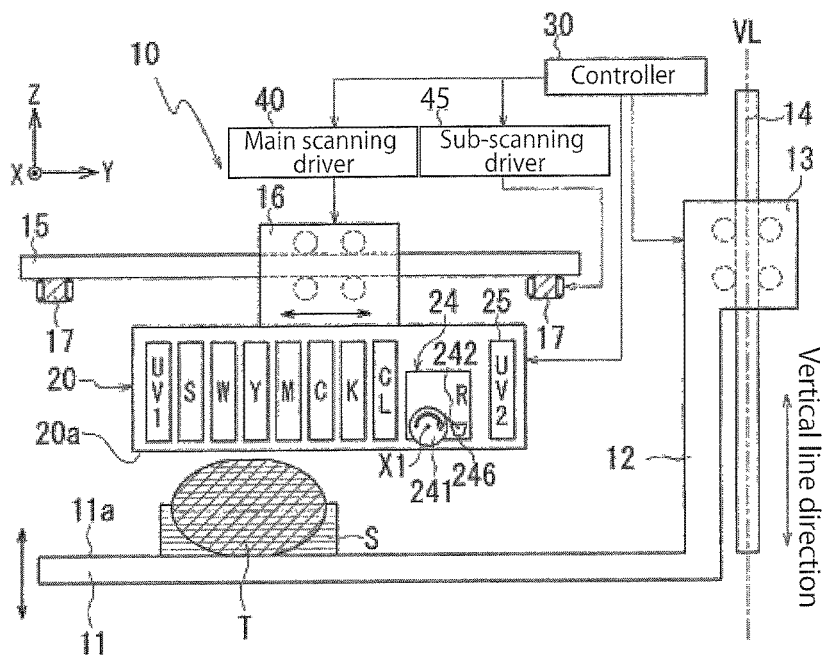
FIGS. 3A and 3B illustrate a configuration of the forming apparatus.
Figure 3B:
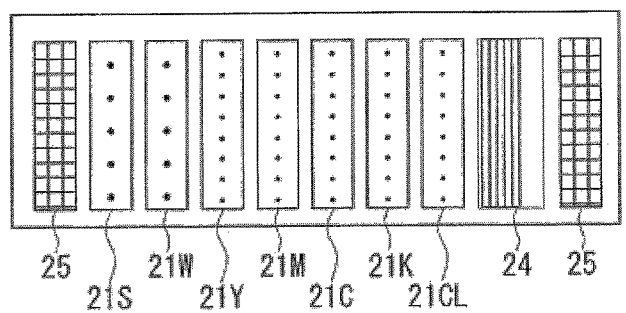

FIG. 1 is a perspective view of an exemplary three-dimensional object T formed by a forming apparatus 10;

FIG. 2 is a cross-sectional view of the three-dimensional object T taken along a plane A in FIG. 1. With virtual lines, FIG. 2 illustrates a support region 53 formed along with the three-dimensional object T when the forming apparatus 10 forms the three-dimensional object T;

FIG. 3A schematically illustrates the configuration of the forming apparatus 10; and FIG. 3B is a plan view of a head 20 of the forming apparatus 10, as viewed from below on a platform 11 side.
Three-Dimensional Object T First, the three-dimensional object T formed by the forming apparatus 10 will be described. As illustrated in FIGS. 1 and 2, the three-dimensional object T according to the embodiment is formed by covering a surface of an inner build region 50 with an intermediate region 51 and a colored region 52 in this order. The inner build region 50 is formed of an ink composite of white (W). The intermediate region 51 includes the ink composite of white (W) and a transparent (CL) ink composite. The colored region 52 includes an ink composite containing coloring components (Color), and the transparent (CL) ink composite.

The three-dimensional object T has an upper end T1 and a lower end T2, which are flat surfaces parallel to each other. The three-dimensional object T has such a circular shape that an outer diameter of the three-dimensional object T increases as distances from the upper end T1 and the lower end T2 increase, and that an approximately central portion of the three-dimensional object T in a height direction has the largest outer diameter. When the three-dimensional object T is formed by the forming apparatus 10, as illustrated in FIG. 2, an approximately half portion of the three-dimensional object T on a lower side is covered with the support region 53 so as to form a three-dimensional object T'. After that, the support region 53 is removed to obtain the three-dimensional object T.

The inner build region 50 is a center region of the three-dimensional object T. The light-reflecting white (W) ink composite is cured to make the inner build region 50 have an external shape in accordance with a shape of the three-dimensional object T. In the embodiment, the inner build region 50 is solid in such a manner that an inside of the inner build region 50 is densely filled with the white (W) ink composite. The inner build region 50, however, may be hollow.

The inner build region 50 is provided to reflect light that has entered from a surface of the three-dimensional object T. This improves visual recognizability of the colored region 52 outside of the inner build region 50. In light of the above circumstances, it suffices that at least a range of the inner build region 50 having a predetermined thickness on the surface side alone is formed of the light-reflecting white (W) ink composite.

The intermediate region 51 includes the white (W) ink composite and the transparent (CL) ink composite, and is formed by curing these ink composites. The intermediate region 51 covers the whole surface of the inner build region 50 and has a predetermined thickness. The intermediate region 51 is provided to enhance affinity between the colored region 52, which covers a surface of the intermediate region 51, and the inner build region 50.

The colored region 52 is a mixed region formed of the ink composite, which includes, for example, Y (yellow), M (magenta), C (cyan), and K (black) as the coloring components, and the transparent (CL) ink composite. The colored region 52 is formed by curing these ink composites. The colored region 52 covers the whole surface of the intermediate region 51. The ink composite, which includes Y (yellow), M (magenta), C (cyan), K (black), and other colors as the coloring components, lands on the colored region 52 at a predetermined ratio in accordance with a target color. The color that the colored region 52 assumes appears on the surface of the three-dimensional object T.

It should be noted that an ink composite in the colored region 52 should not be necessarily limited to the ink composite including the above-described coloring components such as Y (yellow), M (magenta), C (cyan), and K (black). Other than the transparent (CL) ink composite, the colored region 52 may include the white (W) ink composite. Alternatively, the colored region 52 may include an ink composite to show a neutral color obtained by mixing Y (yellow), M (magenta), and C (cyan) in a combination as desired.

The support region 53 is formed by curing an ink composite (support material composite). In forming the three-dimensional object T by depositing ink layers L, described later, in the height direction, the support region 53 is provided to support a lower surface of the region where no other ink layers exist below some of the ink layers on a platform 11 side so as to support the ink layers concerned (see FIG. 4).
Forming Apparatus 10

As illustrated in FIG. 3A, the forming apparatus 10 includes the platform 11 of the three-dimensional object T, a head 20, and a controller 30. The head 20 is arranged to be movable in a main scanning direction Y on an upper side of the platform 11. The controller 30 controls the forming apparatus 10. The forming apparatus 10 further includes a main scanning driver 40 and a sub-scanning driver 45. The main scanning driver 40 causes the head 20 to move in the main scanning direction Y in accordance with an instruction from the controller 30. The sub-scanning driver 45 causes the head 20 to move in the sub-scanning direction X in accordance with an instruction from the controller 30.

The platform 11 is a plate member disposed approximately horizontally and perpendicular to a vertical line VL. The platform 11, which has an approximately rectangular shape in a plan view, has such a predetermined area that the three-dimensional object T to be formed is mountable. An upper surface 11a of the platform 11 is a surface on which the three-dimensional object T to be formed is mounted, and is a flat surface perpendicular to the vertical line VL.

To one side of the platform 11, a coupling arm 12 is coupled and extends in the vertical line VL direction. A coupler 13, which is disposed on an upper portion of the coupling arm 12, is coupled to a guide rail 14 disposed along the vertical line VL. In this state, the coupler 13 is disposed to be movable in a longitudinal direction of the guide rail 14. When a drive mechanism (not illustrated) inside of the coupler 13 operates based on a command from the controller 30, the platform 11, which is coupled to the coupler 13 through the coupling arm 12, moves up and down along the vertical line VL.

On the upper side of the platform 11, a guide rail 15 is disposed in the main scanning direction Y. On the guide rail 15, the head 20 is disposed to be movable in the main scanning direction Y. The head 20 includes a plurality of ink heads 21 (21S, 21W, 21Y, 21M, 21C, 21K, and 21CL), a roller unit 24, and ultraviolet (UV) light sources 25 (curer). The ink heads 21 extrude the respective ink composites. The roller unit 24 makes uniform the heights of layers of the extruded ink composites and flattens the layers. The ultraviolet light sources 25 irradiate each of the flattened layers of the ink composites with ultraviolet light to cure ultraviolet curable resins contained in the ink composites.

The head 20 includes a drive mechanism, not illustrated, in a coupler 16 to couple the head 20 to the guide rail 15. The main scanning driver 40 drives the drive mechanism based on a command from the controller 30 so as to move the head 20 in the main scanning direction Y along the guide rail 15.

One end and the other end of the guide rail 15 in the longitudinal direction are supported by guide rails 17, 17 parallel to each other in the sub-scanning direction X. On these guide rails 17, 17, the guide rail 15 is arranged to be movable in the sub-scanning direction X perpendicular to the main scanning direction Y. In the embodiment, the sub-scanning driver 45 drives a drive mechanism, not illustrated, based on a command from the controller 30 so as to move the guide rail 15 and the head 20 in the sub-scanning direction X.

As illustrated in FIG. 3A, the ultraviolet light sources 25, 25 are disposed on a lower surface 20a of the head 20 opposed to the platform 11 on both sides in the main scanning direction Y. Between the ultraviolet light sources 25, 25, the plurality of ink heads 21 (21S, 21W, 21Y, 21M, 21C, 21K, and 21CL), which extrude the ink composites, and the roller unit 24 are disposed side by side at a predetermined interval in the main scanning direction Y.

The ink heads 21 include a support material head 21S, a white ink head 21W, a plurality of color ink heads (21Y, 21M, 21C, and 21K), and a clear ink head 21CL. The color ink heads 21 include a yellow ink head 21Y, a magenta ink head 21M, a cyan ink head 21C, and a black ink head 21K. The yellow ink head 21Y extrudes yellow ink (Y: Yellow). The magenta ink head 21M extrudes magenta ink (M: Magenta). The cyan ink head 21C extrudes cyan ink (C: Cyan). The black ink head 21K extrudes black ink (K: Black). The yellow ink head 21Y, the magenta ink head 21M, the cyan ink head 21C, and the black ink head 21K are disposed in this order from one side to the other side in the longitudinal direction of the head 20 (lateral direction in FIG. 3B).

The support material head 21S, the white ink head 21W, the color ink heads 21 (21Y, 21M, 21C, and 21K), and the clear ink head 21CL are ink-jet heads to extrude ink droplets of ultraviolet curable inks by an ink-jet technology. These ink heads are located at a position in the sub-scanning direction (X direction) suitable for extruding purposes, and are disposed side by side at a predetermined interval in the main scanning direction (Y direction).

It should be noted that publicly known ink-jet heads may be suitably used as the support material head 21S, the white ink head 21W, the color ink heads 21 (21Y, 21M, 21C, and 21K), and the clear ink head 21CL. These ink-jet heads each include an array of nozzles on a surface opposed to the platform 11. The array of nozzles includes a plurality of nozzles disposed side by side in the sub-scanning direction. Each of the ink-jet heads is arranged to extrude ink droplets toward the platform 11 from the array of nozzles of the ink-jet head.

A nozzle direction in which the plurality of nozzles are disposed is perpendicular to the main scanning direction. In a modification of the configuration of the ink-jet head, the main scanning direction and the nozzle array direction may intersect each other at an angle other than a right angle.

The arrangement in which the support material head 21S, the white ink head 21W, the color ink heads 21 (21Y, 21M, 21C, and 21K), and the clear ink head 21CL are arrayed should not be limited to the illustrated configuration but may be modified in various manners. For example, some of the ink-jet heads may be arranged at a position deviated from a position of the other ink-jet heads in the sub-scanning direction. The head 20 may further include ink-jet heads of lighter variations of the above-described colors and colors such as R (red), G (green), B (blue), and orange.

The color ink heads 21 (21Y, 21M, 21C, and 21K) are ink-jet heads to extrude ink droplets of the color inks having the colors different from each other. All of the inks (ink composites) extruded from the color ink heads 21 (21Y, 21M, 21C, and 21K) are coloring inks (ink composites containing coloring components) used for forming the colored region 52 illustrated in FIG. 2. Each of these coloring inks is an ink composite containing a coloring component such as a coloring pigment, a binder component such as an ultraviolet curable resin, a solvent component to maintain the binder component and the coloring component in a dispersed state, and various kinds of additives.

The white ink head 21W is an ink-jet head to extrude ink droplets of white (W) ink. The white (W) ink composite is an ink mainly used for forming the inner build region 50 and the intermediate region 51 of the white ink (W) and the transparent ink (CL), as illustrated in FIG. 2. This ink is the white (W) ink composite containing a coloring component such as a white pigment, a binder component such as an ultraviolet curable resin, a solvent component to maintain the binder component and the coloring component in a dispersed state, and various kinds of additives.

The clear ink head 21CL is an ink-jet head to extrude ink droplets of clear ink. In this case, the clear ink is a transparent (CL) ink. This transparent (CL) ink composite is an ink used for forming the intermediate region 51 containing the white (W) ink composite and the transparent (CL) ink composite, and the colored region 52. This ink is the transparent (CL) ink composite containing a binder component such as an ultraviolet curable resin, a solvent component to maintain the binder component in a dispersed state, and various kinds of additives.

It suffices that the transparent ink composite is an ink capable of forming a transparent layer that has a light transmission ratio per unit thickness of 50% or more. When the light transmission ratio per unit thickness of the transparent layer is less than 50%, it is not desirable because light transmission is so inconveniently interrupted that the three-dimensional object cannot assume a color as desired by subtractive mixture of colors. Preferably, an ink having a light transmission ratio per unit thickness of the transparent layer of 80% or more should be used. More preferably, an ink having a light transmission ratio per unit thickness of the transparent layer of 90% or more should be used.

The support material head 21S is an ink-jet head to extrude ink droplets including a material of a support layer. This support ink (S) is an ink used for forming the support region 53 to surround and support an outer circumference of the three-dimensional object T. The ink is an ink composite containing a binder component, which is an ultraviolet curable resin and is a resin soluble in water after cured, a solvent component to maintain the binder component in a dispersed state, and various kinds of additives.

A plurality of ultraviolet light sources 25, which is an exemplary ultraviolet light irradiator, generate ultraviolet light to cure the ultraviolet curable inks. As the ultraviolet light sources 25, for example, UVLEDs (ultraviolet LEDs) may be suitably used. Alternatively, as the ultraviolet light sources 25, metal halide lamps and mercury lamps may be also used.

The roller unit 24 is a configuration to flatten each layer of the ultraviolet curable inks formed in producing the three-dimensional object T. In this embodiment, the roller unit 24 is disposed between a row of the color ink heads 21Y, 21M, 21C, and 21K, the white ink head 21W, the clear ink head 21CL, and the support material head 21S, and the ultraviolet light source 25 (UV2) on the other side. Thus, the roller unit 24 is disposed at a position in the sub-scanning direction suitable for flattening purposes relative to the row of the color ink heads 21Y, 21M, 21C, and 21K, the white ink head 21W, the clear ink head 21CL, and the support material head 21S. The roller unit 24 and the row of these heads are disposed side by side in the main scanning direction.

In this embodiment, the roller unit 24 includes a roller 241, a blade 242, and an ink recoverer 246.

The roller 241 is an exemplary flattener to flatten a surface of each layer of the inks formed by the ink-jet heads. In a main scanning operation, for example, the roller 241 comes into contact with the surface of the layer of the ink so as to flatten the layer of the ink.

The blade 242 is a blade member to remove the ink, which has been scraped by the roller 241, from the roller 241. The ink recoverer 246 is a recoverer to recover the ink removed from the roller 241 by the blade 242.

Figure 4:
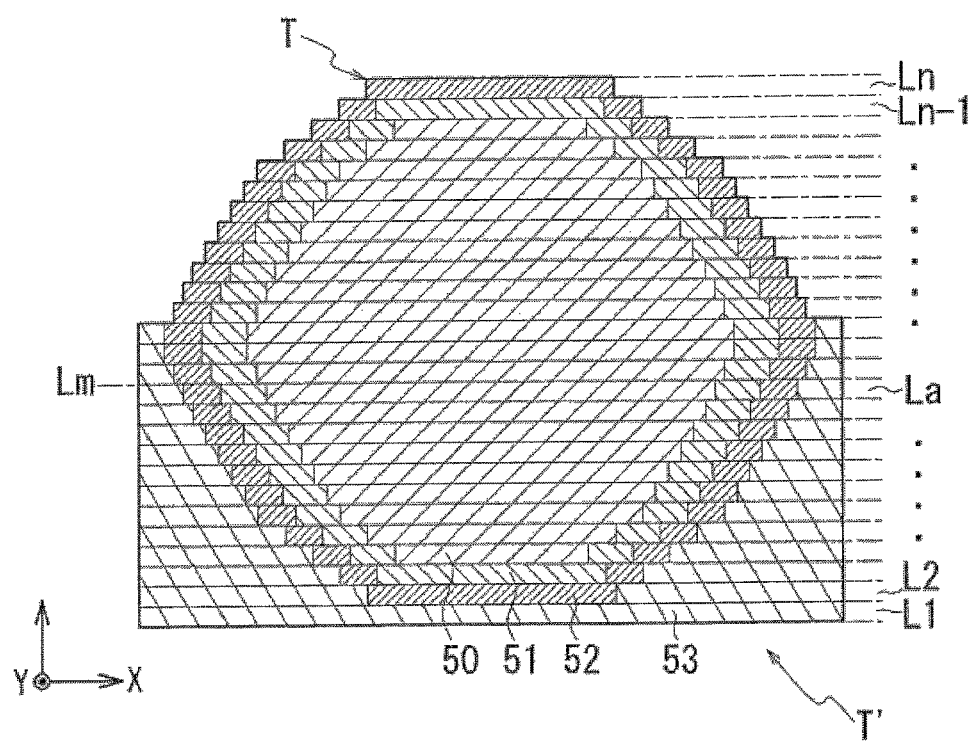
FIG. 4 illustrates three-dimensional data of the three-dimensional object formed by the forming apparatus.
Figure 5:
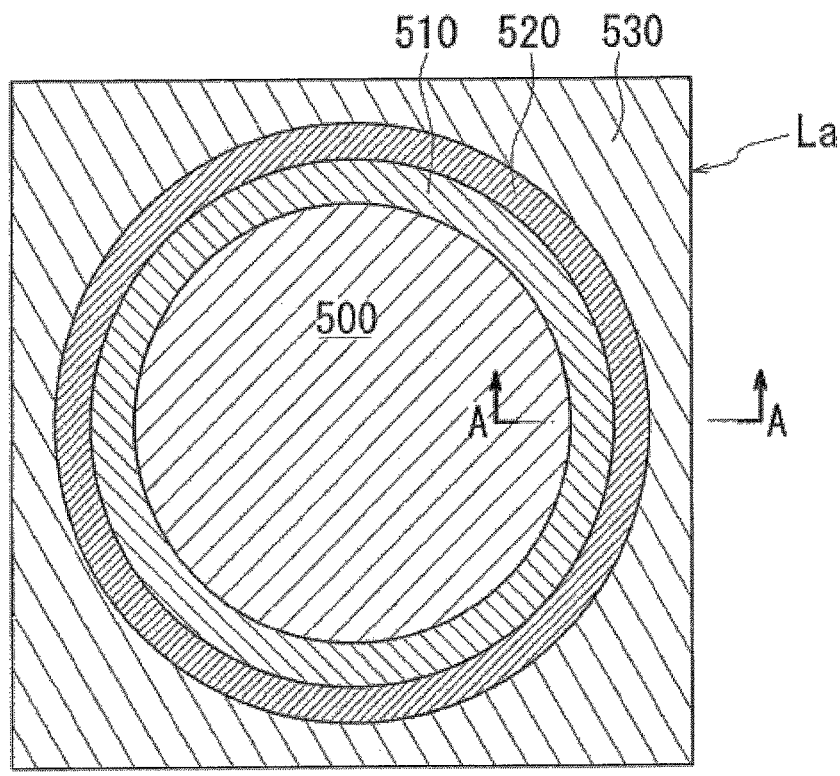
FIG. 5 is a diagram illustrating an ink layer formed based on slice data of the three-dimensional object formed by the forming apparatus.

Formation of the three-dimensional object T by the forming apparatus 10 will now be described. FIG. 4 illustrates three-dimensional data used in formation of the three-dimensional object T by the forming apparatus 10. The three-dimensional data corresponds to a cross-section of the three-dimensional object T in FIG. 2. FIG. 5 is a diagram illustrating an ink layer La formed based on slice data of the a-th ink layer La when the three-dimensional object T is divided into N (positive integer) ink layers L in the height direction.

The forming apparatus 10 slices (divides) the three-dimensional object T at a predetermined interval in the height direction to set the N ink layers L (L1 to Ln: n is an arbitrary positive integer), and forms an ink layer L1, which is on the platform 11 side (lower side), to an ink layer Ln in sequence to form the three-dimensional object T.

Each of the ink layers L is formed by extruding the ink composite containing ultraviolet curable resin by the head 20 to form an ink layer of the ink composite before cured (uncured ink layer), and subsequently irradiating the uncured ink layer thus formed with ultraviolet light to cure the ink layer. In this case, the uncured ink layer is formed by generating slice data, which specifies each ink layer L (L1 to Ln), from three-dimensional data (3D data) of the three-dimensional object T, and controlling extrusion of the ink composite from each of the ink heads 21S, 21W, 21Y, 21M, 21C, 21K, and 21CL based on the generated slice data.

When the three-dimensional data (three-dimensional data of the three-dimensional object T) indicating a distribution of the regions (the inner build region 50, the intermediate region 51, the colored region 52, and the support region 53) of the three-dimensional object T has the content illustrated in FIG. 4, the three-dimensional data is divided into N pieces in a build direction (height direction) of the three-dimensional object T so as to generate slice data of each ink layer. Then, slice data of the a-th ink layer La, for example, will have the content for forming the ink layer La illustrated in FIG. 5.

The slice data for forming the ink layer La illustrated in FIG. 5 is two-dimensional data indicating a distribution of the regions (an inner build region portion 500, an intermediate region portion 510, and a colored region portion 520) in a cross-section (ink layer La) of the three-dimensional object T, and a distribution of a support region portion 530 surrounding an outer circumference of the colored region portion 520. The two-dimensional data makes it possible to specify a position on a plane onto which each of the ink composites is extruded, and an amount of extrusion of the ink composite.

In the forming apparatus 10, when each ink layer L is formed, the controller 30 controls extrusion of the ink composite from each of the ink heads 21S, 21W, 21Y, 21M, 21C, 21K, and 21CL of the head 20 based on the slice data while moving the head 20 in the main scanning direction Y. Thus, the ink layer La is formed in such a manner that part (the inner build region portion 500, the intermediate region portion 510, the colored region portion 520, and the support region portion 530) of the respective regions (the inner build region 50, the intermediate region 51, the colored region 52, and the support region 53) exists in the distribution specified by the slice data (see FIG. 5).

Specifically, the ink layer L is formed by performing a main scanning operation and a sub-scanning operation in turn. The main scanning operation is alternate repetition of a pass operation of extruding the ink composite while moving the head 20 from one side (left side in FIG. 3A) of the guide rail 15 to the other side (right side in FIG. 3A) of the guide rail 15 and a pass operation of extruding the ink composite while moving the head 20 from the other side to the one side of the guide rail 15. The sub-scanning operation is performed while moving the head 20 in the sub-scanning direction X.

In the last pass operation of the main scanning operation, the ink layer L before cured (uncured build material layer) is flattened by the roller 241, and the uncured build material layer is cured by ultraviolet light emitted from the ultraviolet light sources 25 so as to form the ink layer L.

Thus, the plurality of ink layers L are deposited in the Z direction (height direction) to form the three-dimensional object T. Of the inner build region portions 500 of the ink layers, the inner build region 50 is formed to have a three-dimensional shape corresponding to an external shape of the three-dimensional object T. Of the intermediate region portions 510 of the ink layers, the intermediate region 51 is formed to surround the surface of the inner build region 50. Of the colored region portions 520 of the ink layers, the colored region 52 is formed to surround the surface of the intermediate region 51. Of the support region portions 530 of the ink layers, the support region 53 is formed to support the lower side of the three-dimensional object T.

The inner build region 50, the intermediate region 51, and the colored region 52 are arranged in this order to form the three-dimensional object T. Consequently, even if the surface of the three-dimensional object T finally obtained is viewed in any of the X, Y, and Z directions, the three-dimensional object T will have the arrangement of the inner build region 50, the intermediate region 51, and the colored region 52 in this order. This makes it possible to recognize a color tone expressed by subtractive mixing.

Figure 6:
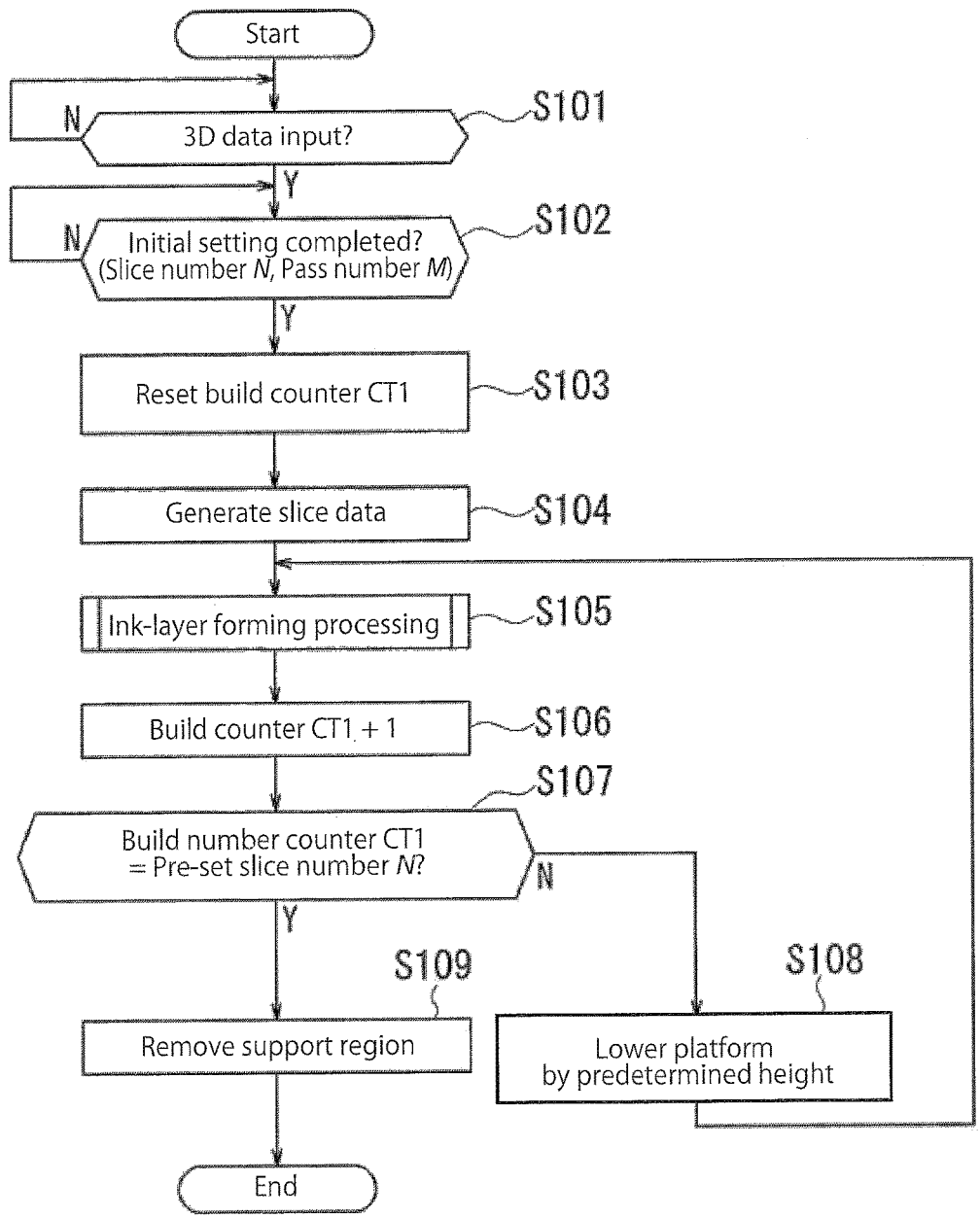
FIG. 6 is a flowchart of formation of the three-dimensional object by the forming apparatus.

Referring to a flowchart in FIG. 6, a forming process of the three-dimensional object T will be described below. FIG. 6 is the flowchart of the forming process of the three-dimensional object T performed by the forming apparatus 10.

In the controller 30, after three-dimensional (3D) data of the three-dimensional object T is input (Yes at step S101), the slice number N (a number of the ink layers L) of the three-dimensional object T and the number of main scanning operations (pass number M) at the time of forming each ink layer L are set (Yes at step S102). Then, at step S103, the controller 30 resets a value of a build counter CT1 to start forming the three-dimensional object T anew. The build counter CT1 is a counter to count the number of formed ink layers. When the build counter CT1 has a value "3", for example, it refers to completion of forming a third ink layer.

Subsequently, at step S104, the controller 30 divides the 3D data in accordance with the slice number N to generate slice data. Thus, N pieces of slice data are generated from the one set of 3D data.

At step S105, while moving the head 20 in the main scanning direction Y and the sub-scanning direction X, the controller 30 causes the ink heads 21S, 21W, 21Y, 21M, 21C, 21K, and 21CL to extrude the respective ink composites to form an ink layer.

Specifically, in order to form an ink layer, the controller 30 performs reading of slice data of the ink layer L to be formed.

In the embodiment, the value of the build counter CT1 is referred to specify which ink layer among n ink layers L1 to Ln the ink layer L to be formed is. Thus, the controller 30 obtains slice data corresponding to the specified ink layer from the plurality of slice data generated at step S104 described above. For example, when the value of the build counter CT1 is "0 (=zero)", it refers to incompletion of forming a first ink layer L1, and consequently, slice data of the first ink layer L1 at the lowermost position is to be obtained.

Then, while moving the head 20 from one side (the other side) to the other side (one side) in the main scanning direction Y, the controller 30 performs pass operations to extrude the respective inks from the support material head 21S, the white ink head 21W, the color ink heads 21 (21Y, 21M, 21C, and 21K), and the clear ink head 21CL of the head 20.

For every position (pixel) having a predetermined area on a build space (X-Y plane space) on the platform 11, the slice data specifies whether the respective inks are extruded from the support material head 21S, the white ink head 21W, the color ink heads 21 (21Y, 21M, 21C, and 21K), and the clear ink head 21CL of the head 20, and specifies extrusion amounts of the inks in extrusion of the inks.

Consequently, in the pass operations of the head 20, when the support material head 21S, the white ink head 21W, the color ink heads 21 (21Y, 21M, 21C, and 21K), and the clear ink head 21CL of the head 20 pass by a predetermined position specified by the slice data, the controller 30 causes the ink heads to extrude the inks to form a new ink layer on the upper surface 11a of the platform 11 or on an ink layer already formed.

An example of forming the ink layer La in FIG. 4 will now be described. In this example, the head 20 performs pass operations by moving from a predetermined position on the left side in FIG. 4 to a predetermined position on the right side in FIG. 4. From the left side in FIG. 4, the ink layer La includes the support region 53, the colored region 52, the intermediate region 51, the inner build region 50, the intermediate region 51, the colored region 52, and the support region 53 in this order.

In light of the above circumstances, when the support material head 21S passes by an upper side of the support region 53, the controller 30 causes the support material head 21S to extrude the ink (support material composite). When the white ink head 21W passes by an upper side of the inner build region 50, the controller 30 causes the white ink head 21W to extrude the ink (white (W) ink composite).

When the clear ink head 21CL and the white ink head 21W pass by an upper side of the intermediate region 51, the controller 30 causes these ink heads to extrude the inks (transparent (CL) ink composite and white (W) ink composite). When the white ink head 21W, the color ink heads 21 (21Y, 21M, 21C, and 21K), and the clear ink head (21CL) pass by an upper side of the colored region 52, the controller 30 causes the corresponding heads to extrude the ink composites in accordance with a color tone represented in the colored region 52.

The controller 30 performs such pass operations of extruding the ink composites while moving the head 20 times of the pass number set at step S102 described above so as to form a new ink layer. In the last pass operation, uncured ink layers of the white (W) ink composite, which have been extruded and deposited until then, are flattened, and irradiated with and cured by ultraviolet light.

When the colored region portion 520 is formed, the transparent (CL) ink composite is extruded in addition to the ink composite containing the coloring component (Color). This is because the transparent (CL) ink composite is used as replenishment ink to replenish a filling density (ink filling density) of the ink composite containing the coloring component (Color). In a case where the colored region portion 520 is only formed of the ink composite containing the coloring component (Color), part of the colored region portion 520 in which a color (color depth) to show finally is deep has a large amount of the ink composite whereas part of the colored region portion 520 in which the color depth is small has a small amount of the ink composite. As a result, in the colored region portion 520, the ink composite containing the coloring component (Color) has different filling densities at different positions. Since an area where the filling density is small is thinner than an area where the filling density is large, the surface of the colored region portion 520 becomes uneven and has voids disadvantageously. Unevenness and voids of the colored region portion 520 cause irregular reflection and refraction of light incident on the colored region 52 of the surface of the three-dimensional object T finally obtained. This may degrade the color tone assumed by the surface of the three-dimensional object T and cause the three-dimensional object T to lose the shape.

In light of the above circumstances, in the embodiment, the transparent (CL) ink composite is used as the replenishment ink to make uniform the filling density of the ink composite. This prevents unevenness and voids from occurring on the surface of the colored region portion 520 so as to prevent the color tone assumed by the surface of the three-dimensional object T finally obtained from degrading and to prevent the three-dimensional object T from losing the shape.

It should be noted that in forming the new ink layer at step S104, when the width of the ink heads 21 in the sub-scanning direction is larger than the width of the ink layer to be formed, it is necessary to form part (inner build region portion 500, intermediate region portion 510, colored region portion 520, and support region portion 530) of the ink layer anew adjacent to part (inner build region portion 500, intermediate region portion 510, colored region portion 520, and support region portion 530) of the ink layer that has been already formed at the time. Consequently, in this case, the controller 30 causes the head 20 to move for a predetermined distance in the sub-scanning direction X, and performs the predetermined number of pass operations so as to form the whole ink layer La specified by the slice data.

When the forming processing of the ink layer at step S105 is ended, the controller 30 increments a value of the build counter CT1 by "1" at step S106. This refers to completion of the one ink layer L.

Then, at step S107, the controller 30 confirms whether the value of the build counter CT1 reaches the slice number N set at step S102. When the value of the build counter CT1 is not equal to the slice number N (No at step S107), the controller 30 shifts to processing at step S105.

Thus, after shifting to step S105, the controller 30 performs forming processing of a new ink layer. For example, when the value of the build counter CT1 at this point in time is "1", this point in time refers to a point in time at which formation of the first ink layer L1 is completed, and consequently, a second ink layer L2 from the bottom is to be formed.

Thus, until the value of the build counter CT1 becomes the slice number N set at step S102, processing from step S105 to step S108 is repeated to form and deposit ink layers L in sequence.

Then, when the value of the build counter CT1 reaches the slice number N set at step S102, a confirmation at step S107 is affirmed (Yes at step S107), and the controller 30 ends the forming processing of the three-dimensional object T.

Thus, finally, the three-dimensional object T formed of the deposited ink layers L is produced. For example, when the slice number N set at step S102 is "50", a three-dimensional object T formed of 50 deposited ink layers L is produced.

Figure 7A:
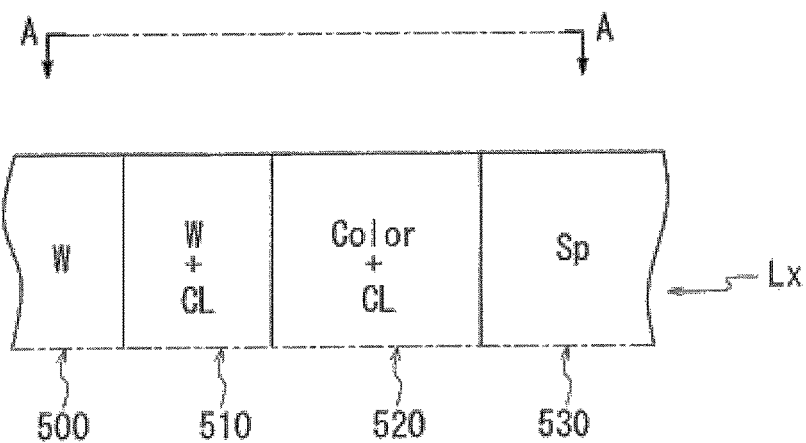
FIGS. 7A and 7B illustrate a distribution of ink composites in an ink layer at some midpoint in forming the three-dimensional object, and a surface state of the ink layer.
Figure 7B:
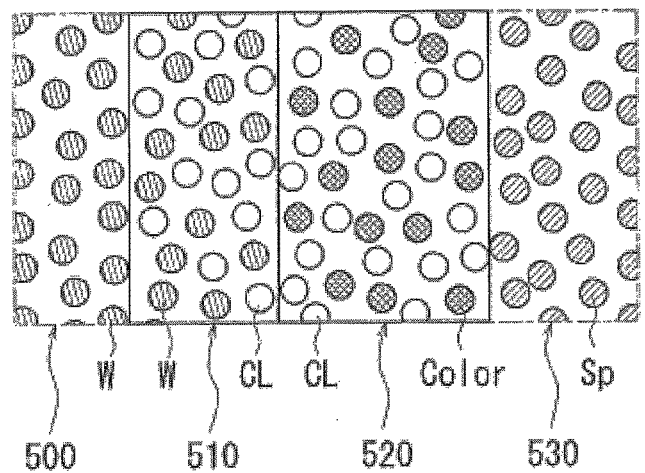
Figure 8A:
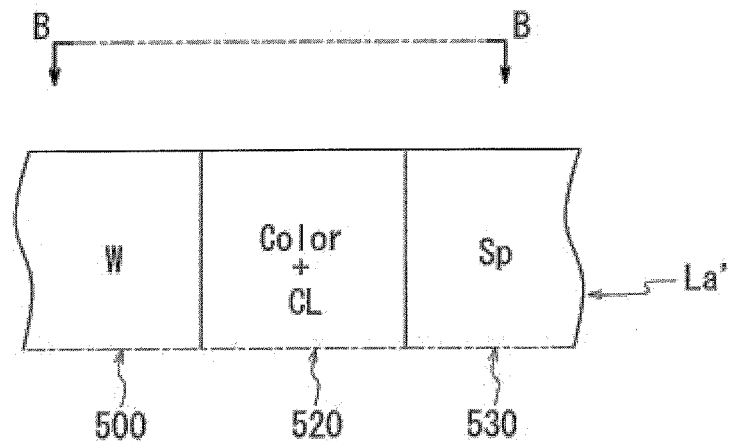
FIGS. 8A and 8B illustrate a distribution of ink composites in an ink layer at some midpoint in forming a three-dimensional object according to a comparative example and a surface state of the ink layer.
Figure 8B:
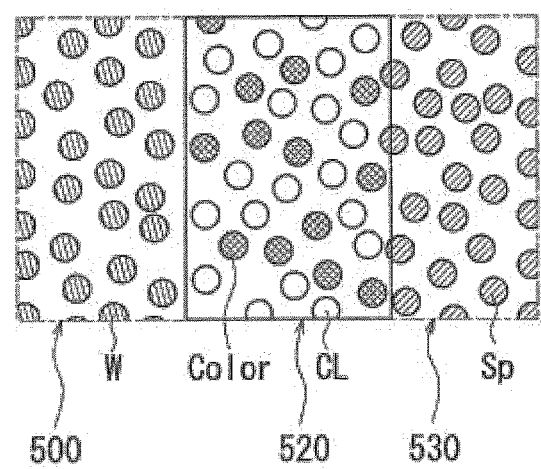

Functions of a case in which the inner build region portion 500, the intermediate region portion 510, the colored region portion 520, and the support region portion 530 of the ink layer L are formed in the above-described process will be described below. FIGS. 7A and 7B illustrate a distribution of the ink composites in an ink layer Lx at some midpoint in forming the three-dimensional object T according to the embodiment and a surface state of the ink layer Lx. FIG. 7A is a schematic cross-sectional view of the ink layer Lx taken along the line A-A in FIG. 5. FIG. 7B is a view of the ink layer Lx in FIG. 7A, as viewed in a direction indicated by the arrows A, and illustrates the distribution of the ink composites in the ink layer Lx. FIGS. 8A and 8B illustrate a distribution of the ink composites of an ink layer La' of a three-dimensional object Ta according to a comparative example and a surface state of the ink layer La'.

The inventor of the present disclosure has found that when surface roughness of the colored region 52 after removing the support region 53 increases, the color quality of the formed three-dimensional object T is degraded. The inventor conducted research and study on what increases the surface roughness of the colored region 52. The inventor has realized that in forming the ink layer L, as a degree of mixing of the ink composite of the colored region 52 and the ink composite of the support region 53 at an interface between these regions increases, the surface roughness of the colored region 52 after removing the support region 53 increases.

The inventor has further realized that (a) the inks themselves affect a degree of mixing of the inks at an interface between the colored region portion 520 and the support region portion 530 of the ink layer L before cured. The inventor has also realized that (b) interposition of the intermediate region portion 510 between the colored region portion 520 and the inner build region portion 500 makes affinity between the colored region portion 520 and the inner build region portion 500 higher than affinity between the colored region portion 520 and the support region portion 530 so as to suppress mixing of the inks at the interface between the colored region portion 520 and the support region portion 530. In light of the above circumstances, the inventor has determined a positional relationship of the region portions (the inner build region portion 500, the intermediate region portion 510, the colored region portion 520, and the support region portion 530) of the ink layer L, and a composition of the ink composites in the intermediate region portion 510.

Specifically, the intermediate region portion 510 between the inner build region 500 and the colored region portion 520 is arranged to be a mixed region of the transparent (CL) ink composite and the white (W) ink composite.

An arrangement of the region portions (the inner build region portion 500, the intermediate region portion 510, the colored region portion 520, and the support region portion 530) of the ink layer L in this case has a positional relationship illustrated in FIG. 7A. As illustrated in FIG. 7B, the transparent (CL) ink composite in the intermediate region portion 510 is also contained in the colored region portion 520 outside of and adjacent to the intermediate region portion 510. The white (W) ink composite is contained in the inner build region portion 500 inside of and adjacent to the intermediate region portion 510.

Thus, the intermediate region portion 510 and the colored region portion 520 contain the transparent (CL) ink composite in common. This transparent (CL) ink composite makes affinity between the intermediate region portion 510 and the colored region portion 520 higher than affinity of the intermediate region portion 510 and the colored region portion 520 with the other regions.

The intermediate region portion 510 and the inner build region portion 500 contain the white (W) ink composite in common. This white (W) ink composite makes affinity between the intermediate region portion 510 and the inner build region portion 500 higher than affinity between the intermediate region portion 510 and the other region.

As a result, affinity between the inner build region portion 500 and the colored region portion 520 through the intermediate region portion 510 becomes higher than affinity between the colored region portion 520 and the support region portion 530. This prevents the inks from mixing at the interface between the colored region portion 520 and the support region portion 530.

This arrangement reduces the surface roughness of the colored region portion 520 (colored region 52) after removing the support region portion 530 (support region 53) so as to improve the color quality of the formed three-dimensional object T.

On the contrary, in the case of the ink layer La' (see FIG. 8A) without the intermediate region portion 510 according to the present disclosure, the inner build region portion 500 is on one side of the colored region portion 520 whereas the support region portion 530 is on the other side of the colored region portion 520. As illustrated in FIG. 8B, since the colored region portion 520 does not contain the transparent (CL) ink composite, affinity between the colored region portion 520 and the inner build region portion 500 and affinity between the colored region portion 520 and the support region portion 530 have no relative difference.

Consequently, at an interface between the colored region portion 520 and the inner build region portion 500 and at an interface between the colored region portion 520 and the support region portion 530, mixing of the ink composites equally occurs.

In this case, since the surface roughness of the colored region portion 520 (colored region 52) after removing the support region portion 530 (support region 53) cannot be controlled, the color quality of the formed three-dimensional object Ta cannot be stabilized.

In light of the above circumstances, in this embodiment, the arrangement of the region portions (the inner build region portion 500, the intermediate region portion 510, the colored region portion 520, and the support region portion 530) in each ink layer is set. This decreases the degree of mixing of the ink composite in the colored region portion 520 and the ink composite in the support region portion 530 at the interface between these region portions. This reduces the surface roughness of the colored region portion 520 (colored region 52) after removing the support region portion 530 (support region 53) so as to improve the color quality of the formed three-dimensional object T.

As described above, in this embodiment, (1) a method for forming a three-dimensional object (three-dimensional object T) by extruding ink droplets from the ink-jet heads includes: an inner-build-region forming step to form the inner build region 50 of the three-dimensional object T; a colored-region forming step to form the colored region 52 outside of the inner build region 50 so as to color the three-dimensional object T; a support-region forming step to form the support region 53 (support region) outside of the colored region 52 so as to support the three-dimensional object T while forming the object T; and an intermediate-region forming step to form the intermediate region 51 between the inner build region 50 and the colored region 52. The intermediate region 51 is formed in such a manner that affinity between the intermediate region 51 and the inner build region 50 and affinity between the intermediate region 51 and the colored region 52 are higher than affinity between the colored region 52 and the support region 53.

With this configuration, affinity between the colored region 52 and the inner build region 50 through the intermediate region 51 becomes higher than affinity between the colored region 52 and the support region 53. This prevents inks from mixing at the interface between the colored region 52 and the support region 53. This configuration reduces surface roughness of the colored region 52 after removing the support region 53 so as to improve the color quality of the formed three-dimensional object T.

(2) The method for forming the three-dimensional object T by depositing the plurality of ink layers L1 to Ln in the height direction includes: a first step to divide the three-dimensional object T into a plurality of sections in the height direction to set the plurality of ink layers L1 to Ln; a second step to generate slice data to specify each of the plurality of ink layers L1 to Ln based on three-dimensional data of the three-dimensional object T; and a third step to control extrusion of the ink composites from the respective ink heads 21 (21S, 21W, 21Y, 21M, 21C, 21K, and 21CL) based on the slice data to form the ink layers L and to deposit the ink layers L in sequence to form the three-dimensional object T. The three-dimensional object T includes: the inner build region 50 having a shape corresponding to an external shape of the three-dimensional object T and formed of the white (W) ink composite at least on the surface side of the inner build region 50; the intermediate region 51 formed of the white (W) ink composite and the transparent (CL) ink composite, and covering the surface of the inner build region 50; and the colored region 52 formed of an ink composite containing a coloring component (Color), and the transparent (CL) ink composite. The colored region 52 covers the surface of the intermediate region 51. The ink layers L include: ink layers each including the inner build region portion 500 to be part of the inner build region 50, the intermediate region portion 510 to be part of the intermediate region 51, and the colored region portion 520 to be part of the colored region 52; and ink layers with the support region portions 530 surrounding the colored region portions 520. The support region portions 530 support the lower surfaces of other ink layers deposited on the upper side of the three-dimensional object T in the height direction. The method further includes a fourth step to remove the support region 53 after forming the three-dimensional object T by depositing the plurality of ink layers L.

With this configuration, the intermediate region 51 includes the white (W) ink composite, which has high affinity to the white (W) ink composite in the inner build region portions 500. The intermediate region 51 also includes the transparent (CL) ink composite, which has high affinity to the transparent (CL) ink composite among the ink composites constituting the colored region portions 520 other than the ink composite containing the coloring component. As a result, affinity between the inner build region 50 and the colored region 52 through the intermediate region 51 becomes higher than affinity between the colored region 52 and the support region 53. This suppresses mixing of the inks at the interface between the colored region 52 and the support region 53 (see FIG. 7B). This configuration makes it possible to reduce surface roughness of the colored region portions 520 (colored region 52) after removing the support region portions 530 (support region 53) so as to improve the color quality of the formed three-dimensional object T.

The present disclosure is specifiable as the forming apparatus 10 of the three-dimensional object T.

(3) The forming apparatus 10 of the three-dimensional object T includes: the platform 11 for the three-dimensional object T; the head 20 disposed movably in the main scanning direction Y on the upper side of the platform 11; the controller 30 (controller) to control movements of the head 20 in the main scanning direction Y and extrusion of the ink composites from the respective ink heads 21S, 21W, 21Y, 21M, 21C, 21K, and 21CL of the head 20; and the ultraviolet light sources 25 (curer) to cure the ink composites extruded from the head 20. The forming apparatus 10 forms ink layers L by curing the ink composites extruded from the head 20 and deposits the ink layers L in the height direction so as to form the three-dimensional object T. The three-dimensional object T includes: the inner build region 50 having a shape corresponding to an external shape of the three-dimensional object T; the intermediate region 51 covering the surface of the inner build region 50; and the colored region 52 covering the surface of the intermediate region 51. The intermediate region 51 contains the ink composites to increase affinity between the intermediate region 51 and the inner build region 50 and affinity between the intermediate region 51 and the colored region 52.

With this configuration, affinity between the inner build region 50 and the colored region 52 through the intermediate region 51 becomes higher than affinity between the colored region 52 and the other region. This suppresses mixing of the inks at the interface between the colored region 52 and the region other than the three-dimensional object T so as to reduce surface roughness of the three-dimensional object T. Thus, the three-dimensional object T finally obtained has a surface with an improved color quality.

(4) The inner build region 50 is formed of the white (W) ink composite at least on a surface side of the inner build region 50. The colored region 52 is formed of an ink composite containing a coloring component, and the transparent (CL) ink composite. The intermediate region 51 is formed of the white (W) ink composite and the transparent (CL) ink composite.

This configuration increases affinity between the intermediate region 51 and the inner build region 50 and affinity between the intermediate region 51 and the colored region 52. As a result, through the intermediate region 51, affinity between the colored region 52 and the inner build region 50 is increased to suppress mixing of the inks at the interface between the colored region 52 and the support region 53.

Moreover, the present disclosure is specifiable as a non-transitory computer-readable storage medium storing a program for causing the forming apparatus 10 to execute processing for forming the three-dimensional object T.

(5) In the non-transitory computer-readable storage medium storing the program for causing the forming apparatus 10 to execute processing for forming the three-dimensional object T by depositing a plurality of ink layers L in the height direction, the processing includes: causing the controller 30 (controller) for the forming apparatus 10 to divide the three-dimensional object T into a plurality of sections in the height direction to set the plurality of ink layers L (FIG. 6: step S102); causing the controller 30 to generate slice data to specify each of the plurality of ink layers L based on three-dimensional data of the three-dimensional object T (FIG. 6: step S104); and causing the controller 30 to control extrusion of the ink composites from the respective ink heads 21S, 21W, 21Y, 21M, 21C, 21K, and 21CL based on the slice data so as to form the ink layers, and deposit the ink layers in sequence so as to form the three-dimensional object T (FIG. 6: steps S105 to S108). The three-dimensional object T includes: the inner build region 50 having a shape corresponding to an external shape of the three-dimensional object T; the intermediate region 51 covering the surface of the inner build region 50; and the colored region 52 covering the surface of the intermediate region 51. The intermediate region 51 includes ink composites for increasing affinity between the intermediate region 51 and the inner build region 50 and affinity between the intermediate region 51 and the colored region 52.

This configuration makes it possible to improve the color quality of the surface of the three-dimensional object T finally obtained.

Obviously, numerous modifications and variations of the present disclosure are possible in light of the above teachings. It is therefore to be understood that within the scope of the appended claims, the present disclosure may be practiced otherwise than as specifically described herein.

Features of the present invention will now be extracted and described.

(1) The method for forming the three-dimensional object by extruding ink droplets from the ink-jet heads includes: the inner-build-region forming step to form the inner build region of the three-dimensional object; the colored-region forming step to form the colored region outside of the inner build region so as to color the three-dimensional object; the support-region forming step to form the support region outside of the colored region so as to support the three-dimensional object while forming the object; and the intermediate-region forming step to form the intermediate region between the inner build region and the colored region. The intermediate region is formed in such a manner that affinity between the intermediate region and the inner build region and affinity between the intermediate region and the colored region are higher than affinity between the colored region and the support region.

With this configuration, affinity between the colored region and the inner build region is increased to prevent the inks from mixing at the interface between the colored region and the support region.

(2) In the method for forming the three-dimensional object described in (1), the inner build region is formed of the white ink composite at least on the surface side of the inner build region. The colored region is formed of the ink composite containing the coloring component, and the transparent ink composite. The intermediate region is formed of the ink composite containing the coloring component, and the transparent ink composite.

This configuration makes affinity between the inner build region and the colored region through the intermediate region higher than affinity between the colored region and the support region. This prevents the inks from mixing at the interface between the colored region and the support region (see FIG. 7B). This configuration reduces the surface roughness of the colored region after removing the support region so as to improve the color quality of the formed three-dimensional object.

(3) The three-dimensional-object forming apparatus includes: the platform for the three-dimensional object; the head disposed movably in the main scanning direction on the upper side of the platform; the controller to control movements of the head in the main scanning direction and extrusion of the ink composites from the head; and the curer to cure the ink composites extruded from the head. The apparatus forms ink layers by curing the ink composites extruded from the head and deposits the ink layers in the height direction so as to form the three-dimensional object. The three-dimensional object includes: the inner build region having a shape corresponding to an external shape of the three-dimensional object; the intermediate region covering the surface of the inner build region; and the colored region covering the surface of the intermediate region. The intermediate region is formed of the ink composites to increase affinity between the intermediate region and the inner build region and affinity between the intermediate region and the colored region.

This configuration makes affinity between the inner build region and the colored region through the intermediate region higher than affinity between the colored region and the other region. This prevents the inks from mixing at the interface between the three-dimensional object and the object other than the three-dimensional object so as to reduce the surface roughness of the three-dimensional object. Thus, the three-dimensional object finally obtained has an improved surface color quality.

(4) In the three-dimensional-object forming apparatus described in (3), the inner build region is formed of the white ink composite at least on the surface side of the inner build region. The colored region is formed of the ink composite containing the coloring component, and the transparent ink composite. The intermediate region is formed of the ink composite containing the coloring component, and the transparent ink composite.

This configuration increases affinity between the intermediate region and the inner build region and affinity between the intermediate region and the colored region. As a result, through the intermediate region, affinity between the colored region and the inner build region is increased to suppress mixing of the inks at the interface between the colored region and the support region.

(5) The non-transitory computer-readable storage medium storing the program for causing the three-dimensional-object forming apparatus to execute processing for forming the three-dimensional object by depositing the plurality of ink layers in the height direction. The processing includes: causing the controller for the three-dimensional-object forming apparatus to divide the three-dimensional object into the plurality of sections in the height direction to set the plurality of ink layers; causing the controller to generate slice data to specify each of the plurality of ink layers based on three-dimensional data of the three-dimensional object; causing the controller to control extrusion of the ink composite from each ink head based on the slice data so as to form the ink layers; causing the controller to cure the ink layers formed at the extrusion controlling step; and causing the controller to repeat the slice-data generating step and the extrusion controlling step to deposit the ink layers in sequence so as to form the three-dimensional object. The three-dimensional object includes: the inner build region having a shape corresponding to an external shape of the three-dimensional object; the intermediate region covering the surface of the inner build region; and the colored region covering the surface of the intermediate region. The intermediate region includes ink composites for increasing affinity between the intermediate region and the inner build region and affinity between the intermediate region and the colored region.

This configuration improves the color quality of the surface of the three-dimensional object finally obtained.

10 forming apparatus
11 platform
12 coupling arm
13, 16 coupler
14, 15, 17 guide rail
20 head
21C, 21M, 21Y, 21K, 21S, 21W, 21CL ink head
25 ultraviolet light source
24 roller unit
241 roller
242 blade
30 controller
40 main scanning driver
45 sub-scanning driver
50 inner build region
500 inner build region portion
51 intermediate region
510 intermediate region portion
52 colored region
520 colored region portion
53 support region
530 support region portion
A plane
CT1 build counter
CAD three-dimensional
L (L1, . . . , La, . . . Ln) ink layer
T three-dimensional object
X sub-scanning direction
Y main scanning direction

What is claimed as new and desired to be secured by Letters Patent of the United States is:

1. A method for forming a three-dimensional object by extruding ink droplets from ink-jet heads, the method comprising:
   forming an inner build region of the object;
   forming a colored region outside of the inner build region so as to color the object;
   forming a support region outside of the colored region so as to support the object while forming the object; and
   forming an intermediate region between the inner build region and the colored region, the intermediate region being formed in such a manner that affinity between the intermediate region and the inner build region and affinity between the intermediate region and the colored region are higher than affinity between the colored region and the support region,
   wherein the inner build region comprises a white ink composite at least on a surface side of the inner build region,
   wherein the colored region comprises
      an ink composite comprising a coloring component, and
      a transparent ink composite, and
   wherein the intermediate region comprises
      the ink composite comprising the coloring component, and
      the transparent ink composite.

* * * * *